United States Patent [19]
Lee

[11] Patent Number: 6,030,696
[45] Date of Patent: Feb. 29, 2000

[54] EXTRUDED POLYOLEFIN FOAM IN THICKER GRADES AND PLANK AND PROCESS THEREFOR

[75] Inventor: Shau-Tarng Lee, Oakland, N.J.

[73] Assignee: Sealed Air Corporation, Saddle Brook, N.J.

[21] Appl. No.: 08/940,366

[22] Filed: Sep. 30, 1997

[51] Int. Cl.[7] ............................... B29C 67/20; C08J 9/06
[52] U.S. Cl. ........................... 428/220; 264/45.9; 264/54; 264/DIG. 5; 428/338; 428/339; 521/79; 521/98; 521/910
[58] Field of Search .................. 521/79, 98, 142, 521/143, 910; 264/45.9, 54, DIG. 5; 428/220, 338, 339, 304.4, 315.7

[56] References Cited

U.S. PATENT DOCUMENTS

| | | |
|---|---|---|
| 3,287,477 | 11/1966 | Vesilind . |
| 3,488,746 | 1/1970 | Gilbert . |
| 3,558,752 | 1/1971 | Sen . |
| 3,787,542 | 1/1974 | Gallagher et al. . |
| 3,839,238 | 10/1974 | Ealding . |
| 3,966,373 | 6/1976 | Johnson . |
| 3,972,970 | 8/1976 | Taylor . |
| 4,120,923 | 10/1978 | Kloker et al. . |
| 4,214,056 | 7/1980 | Watanabe et al. . |
| 4,323,528 | 4/1982 | Collins ........................................ 264/53 |
| 4,464,484 | 8/1984 | Yoshimura et al. . |
| 5,133,913 | 7/1992 | Miyakawa et al. . |
| 5,206,082 | 4/1993 | Malone . |
| 5,278,196 | 1/1994 | Robin et al. . |
| 5,314,926 | 5/1994 | Robin et al. . |
| 5,348,795 | 9/1994 | Park ........................................ 428/220 |
| 5,462,974 | 10/1995 | Lee ............................................ 521/79 |
| 5,470,888 | 11/1995 | Vonken et al. . |
| 5,484,649 | 1/1996 | Vonken et al. . |
| 5,527,573 | 6/1996 | Park et al. ............................ 428/314.8 |
| 5,776,390 | 7/1998 | Fiddelaers et al. ......................... 264/50 |

*Primary Examiner*—Blaine Copenheaver
*Attorney, Agent, or Firm*—Alston & Bird LLP

[57] ABSTRACT

An extruded polyolefin foam in thicknesses of at least about 12 mm and greater of improved compressive strength, extensional viscosity, and reduced aging time and a process for making the foam are disclosed. The foam is prepared using a propane blowing agent. The beneficial properties imparted to thicker grade and plank foams by a propane blowing agent can be achieved with up to as much as 75% by volume of either normal butane or isobutane or both in the blowing agent, depending on the polyolefin selected.

29 Claims, 1 Drawing Sheet

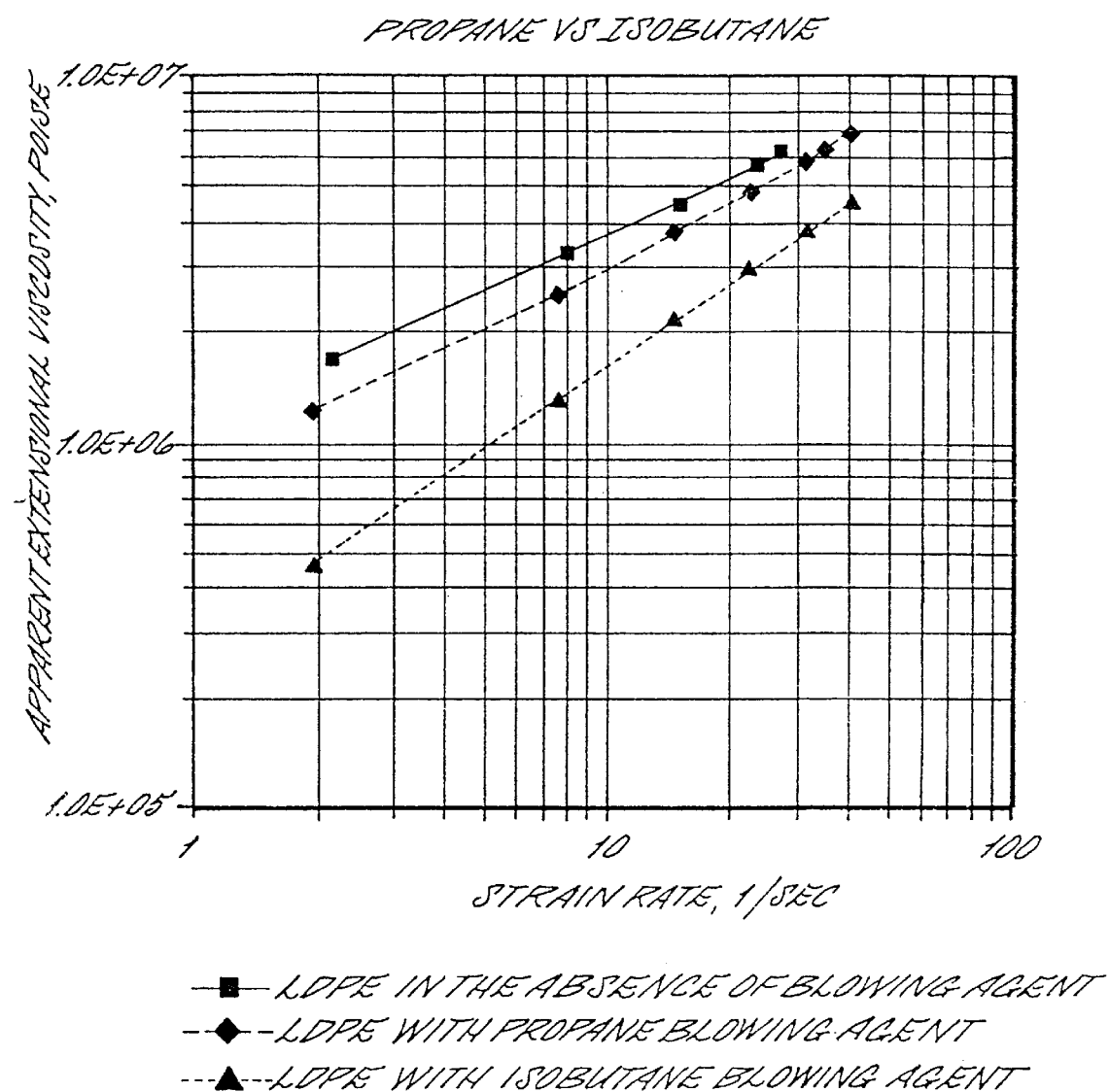

6,030,696

EXTRUDED POLYOLEFIN FOAM IN THICKER GRADES AND PLANK AND PROCESS THEREFOR

FIELD OF THE INVENTION

This invention relates to extruded polyolefin foams and to a process for producing an expanded polyolefin foam product of low density using an expandable polyolefin composition. In particular, this invention relates to the use of blowing agents for incorporating into a plasticized polyolefin resin for foaming by extrusion.

BACKGROUND OF THE INVENTION

Thermoplastic foam products can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting-cell foams to closed or unicell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 kg/m$^3$ to over 1,000 kg/m$^3$, although the latter perhaps more properly are called microcellular structures. True foams are considered to have a density of less than about 800 kg/M$^3$.

Many methods have been developed for the manufacture of foamed thermoplastics, which generally can be classified into three groups: 1) methods for adding a gaseous "blowing agent" to the thermoplastic mass during processing, 2) methods for producing a gaseous blowing agent in the thermoplastic mass during processing, and 3) methods for forming a thermoplastic mass from granules to obtain a cellular structure. Similar blowing agents sometimes are used in the various methods to produce foams. However, the effectiveness of a particular blowing agent varies considerably depending on the thermoplastic resin composition, the method chosen, the process conditions, the additives used, and the product sought.

Blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives may be incorporated into the resin to promote nucleation for a particular blowing agent and, consequently, a more uniform pore distribution. However, the foam is maintained by replacing the blowing agent in the cells with air. Diffusivity of the blowing agent out of the cells relative to air coming into the cells impacts the stability of the foam over time and whether the cells of the foam may collapse. Additives may be incorporated into the resin and process conditions may be adjusted to assist in controlling the diffusivity of the blowing agent, to promote foam stability, and to limit collapse of the foam to acceptable limits.

Methods for producing a blowing agent in situ usually involve a chemical reaction that evolves gas. Polyethylene, silicone, epoxy, and vinyl foams have all been produced by adding a substance that will produce a gaseous blowing agent chemically. For example, dinitroso compounds and hydrazides, which evolve nitrogen gas on decomposition, and bicarbonates, which evolve carbon dioxide, have been added to thermoplastic resins to produce foams.

Polystyrene foams often are produced by "bead molding," in which partially expanded granules or beads are heated in a mold in the presence of a blowing agent to expand and fuse the particles into a rigid unicellular structure. A volatile organic compound or some other gaseous blowing agent is impregnated into the beads. Heat is applied and the pressure is released to cause the beads to expand and fuse.

There are several methods for adding a blowing agent to a thermoplastic resin during processing to produce a foam. Ureaformaldehyde and polyvinylformaldehyde foams have been produced by whipping air into a heated thermoplastic mass before it sets. Polyolefinic foams have been produced by introducing air or some other gas or volatile solvent into a heated thermoplastic polyolefin mass and then heating the mass or reducing pressure to expand the gas and form pores of a desirable size. One more specific method is to impregnate a thermoplastic resin with blowing agent under heat and pressure in a closed vessel. The pressure is released to expand the blowing agent to form "prefoamed," or partially expanded, beads. Prefoamed beads usually are further expanded in an enclosed vessel such as a mold to produce a molded foam product, as is discussed above.

As examples of the use of various blowing agents for molding and prefoamed bead production, Kloker et al. U.S. Pat. No. 4,120,923 and Yoshimura et al. U.S. Pat. No. 4,464,484 disclose the use of the inert gas carbon dioxide as a blowing agent for molded polyolefin foam articles and for polymer beads, respectively. Yoshimura et al. U.S. Pat. No. 4,464,484 disclose that a mixture of carbon dioxide and aliphatic hydrocarbons and halogenated aliphatic hydrocarbons, including CFCs and HCFCs, are useful blowing agents for polyolefin beads. Broad ranges of blends of VOCs, CFCs, and HCFCs with carbon dioxide are disclosed and mixtures of butane or dichlorodifluoromethane and carbon dioxide are exemplified.

Another more specific method, to which the invention claimed herein relates, is to mix the blowing agent with molten thermoplastic resin under pressure and then extrude the mixture through a forming die into a zone of reduced pressure. Shaped extruded foams can be produced by this method using a forming die of particular configuration. Plank, which can be cut to a desirable shape, and thin foam sheets are produced in this manner.

Many of the halogenated hydrocarbons have been used for several years as blowing agents in various methods for producing extruded foams from thermoplastic resins. The halogenated hydrocarbons include the chlorofluorocarbons ("CFCs") and hydrochlorofluorocarbons ("HCFCs"). CFCs and HCFCs are readily impregnable in thermoplastic resins and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs, and other halogenated hydrocarbons typically are either not flammable or are of low flammability, which greatly reduces the care with which they may be used. These compounds have the further advantage of low toxicity. However, governmental regulation is phasing out use of halogenated hydrocarbons because the halogenated hydrocarbons may be responsible for damage to the earth's ozone layer.

Producers of thermoplastic foam products have been seeking alternatives to CFC and HCFC blowing agents for a number of years to reduce or eliminate altogether the amount of halogenated hydrocarbons used. A number of volatile organic compounds (VOCs) have been proposed, although many of these also are somewhat objectionable. VOCs include the light aliphatic hydrocarbons such as ethane, propane, n-butane, isobutane, butylene, isobutene, pentane, neopentane, and hexane, to name but a few. The diffusivity of VOCs can be many times faster than that of the halogenated hydrocarbons and harder to control. Foam collapse and stability problems have been encountered, although high quality foams have been produced using, for example, butane.

VOCs typically are volatile and flammable, thus presenting handling problems and safety concerns. For example, Robin et al. U.S. Pat. No. 5,314,926 describes a blowing agent comprising a mixture of one or more hydrocarbons or partially halogenated alkanes with a fluorinated propane, 1,1,1,2,3,3,3-heptafluoropropane. The hydrocarbons are said to include propane, butane, isobutane, n-pentane, i-pentane, neopentane, n-hexane, 2 methylpentane, 3-methylpentane, and 2,2-dimethylbutane. The fluorinated propane is said to be useful even in small amounts in reducing the flammability of foamable plastics including polystyrene, polyvinyl chloride, polyethylene, and other non-polyisocyanate based foams.

The behavior of VOCs in various thermoplastic resins and the foams prepared therefrom is somewhat unpredictable due to the differences in volatility of the various VOCs and VOC blends, the differences in the foaming behavior of different thermoplastic resins, the wide variation in kinds and amounts of processing additives that are added to the different thermoplastic resins, and a host of other factors too numerous to mention here.

As an example of extrusion foaming, Watanabe et al. U.S. Pat. No. 4,214,054 describe numerous volatile organic blowing agents including various CFCs, VOCs, and the use of decomposable gas-releasing chemical blowing agents for producing extruded polyolefin foams from particular resin compositions.

Johnson U.S. Pat. No. 3,966,373 proposes a method and apparatus for making relatively dense structural foam profiles having a foam core and a dense skin. A partially expanded extruded thermoplastic polymer composition is conveyed through a chilled shaping passage moving at the same rate as the foam to eliminate friction. The dense skin is formed by the chilled passage while the polymer resin is still expanding. Foaming agents are said to include nitrogen, carbon dioxide, lower molecular weight paraffins such as propane, butane, and methylchloride, lower molecular weight olefins such as ethylene, propylene, and butylene or mixtures of the above. No specific mixtures of foaming agents are disclosed. A preferred thermoplastic composition for extrusion to form tongue depressors or ice cream sticks of 320 to 1000 kilograms per cubic meter is disclosed to include polystyrene beads having a pentane blowing agent integrated therewith.

Gilbert U.S. Pat. No. 3,488,746 discloses a process for preparing a foamed polyethylene layflat tube by blow extruding a foamable polyethylene resin composition through an annular die. Blowing agents are said to include lower aliphatic hydrocarbons such as ethane, propane, butane, or pentane, lower alkyl halides such as methylchloride, trichloromethane, or 1,2-dichlorotetrafluorethane and inorganic gases such as carbon dioxide or nitrogen. Butane and isobutylene are said to be preferred. Highly active nucleating agents such as silica or alumina or small quantities of decomposable nucleating agents are disclosed in quantities of up to about 5 percent by weight of the resin.

Vesilyn U.S. Pat. No. 3,287,477 discloses extrusion apparatus and methods for preparing polymer foams and is primarily directed to polystyrene foam. Vesilyn discloses that the extrusion apparatus can also be operated with other polymers including polymers derived from ethylene monomers to produce foam sheets. Blowing agents are said to include examples such as methane, ethane, propane, butane, n-pentane, isopentane, neopentane, hexanes, heptanes, and a variety of others.

Vonken et al. U.S. Pat. No. 5,484,649 describes extruded polystyrene expanded films and shaped articles, including building materials, that have been prepared using propane, butane, or mixtures of propane and butane as blowing agents in polystyrene melts that are treated with flameproofing agents and nucleating agents. The foams are said preferably to rest for at least about one week to adjust the amount of residual blowing agent to the minimum required for further expansion by heat treatment. The post-extrusion expansion step is said to increase the thickness of the extrudate by a factor of from about 1.8 to 2.

Polystyrene typically is considered to have different foaming characteristics from the polyolefins. Polystyrene is an amorphous material whereas the polyolefins are semi-crystalline.

Butane blowing agents normally are used for foam extrusion of low density polyolefin foams (over 30% expansion) in an amount of from about 15% to 16% by weight of the resin, typically in combination with active nucleating agents in amounts of about 0.5% by weight of the resin. Butane is extremely flammable and at the levels used for blowing agent an aging period typically is provided to reduce residual butane blowing agents below explosive limits prior to shipment of the foam.

Propane has successfully been used as a blowing agent for producing polyethylene thin foam sheet and foams of about 11 mm thickness or less, despite its volatility and flammability. However, there has been no disclosure of or suggestion to use propane as a blowing agent to produce thicker grade foams or plank and there has been no disclosure or suggestion of improvements in properties of such foams.

It is desirable to continue to develop combinations of blowing agents and thermoplastic resins that can result in foam products having improved properties, including safety, foam physical characteristics, and other properties.

SUMMARY OF THE INVENTION

The invention claimed herein relates to the extrusion foaming of polyolefin resins into relatively low density thicker grade and plank foams having improved properties, particularly compressive strength, wherein the blowing agent is propane. "Thicker grade" foams means foams of about 12 mm or more. Thin foam sheet is typically thought of as ¼-in or less (6 mm or so). Plank is typically thought of as 2 inches or more in thickness (about 50 mm).

The benefits in compressive strength in thicker grade foams can usually be achieved even when the amount of butane used in the propane blowing agent is up to about 75% by volume, depending on the polyolefin selected. Aging time to reach the blowing agent lowest explosive limit can be reduced as compared to butane, which is important from safety and flammability concerns. Extensional viscosity of the melt extruded through the plank die can be improved. These benefits have not previously been recognized or appreciated in polyethylene foam sheet prepared with 100% propane blowing agent.

While not wishing to be bound by theory, it is believed that the benefits in compressive strength are achieved because of the greater efficiency of the propane blowing agent compared to other blowing agents. Foaming efficiency refers to the amount of blowing agent that is used to achieve a particular density. It is believed that more efficient blowing agents produce less of the blowing agent in cell walls of the foam and that the compressive strength of the foam is improved when less blowing agent is present in the cell walls of the foam.

Thicker grade polyolefin foams and plank made in accordance with the invention can have an apparent extensional viscosity at a die temperature of about 110 degrees Centigrade of from about $1.2 \times 10^6$ to $7 \times 10^6$ poise at a strain rate of from about 1.9 to 40 per second, respectively. As should be recognized by the skilled artisan, the resin typically enters the die at a much higher temperature than the die temperature.

Thicker grade polyolefin foams and plank made in accordance with the invention can have a compressive strength about one hour after extrusion of from about 9 to 12 psig at 25 percent compression by unit volume. Foam plank made in accordance with the invention can have a compressive strength about two weeks after extrusion of from about 20 to 25 psig at 50 percent compression by unit volume.

When needle punched, foam plank made in accordance with the invention can reach its lowest explosive limiting value within about two weeks after extrusion.

Typically, foam plank made in accordance with the invention has a cell count of from about 10 to 30 cells per inch and a density of from about 20 to 120 kg/m$^3$.

In a more specific embodiment, foam plank made in accordance with the invention is prepared from a low density polyethylene resin and a blowing agent selected from the group consisting of propane and a blend of propane with up to about 65% by weight of either normal butane or isobutane. The polymer melt is extruded and expanded to a nominal thickness of at least about 12 mm or more to form a thicker grade foam or foam plank. Normally, the polyethylene foam also comprises a processing additive, including, for example, glycerol monostearate (GMS), and a nucleating agent, including, for example, talc.

In another more specific embodiment, thicker grade foam and foam plank made in accordance with the invention is prepared from a polypropylene resin and a blowing agent selected from the group consisting of propane and a blend of propane with up to about 75% by weight of either normal butane or isobutane. While not wishing to be bound by theory, it is believed that the blowing agent efficiency of propane in polypropylene is greater than in polyethylene, so that less propane is required to achieve the benefits of the invention.

Thus, the invention provides, among other things, thicker grade foam and foam plank prepared from polypropylene and low density polyethylene resins that are expanded with a propane blowing agent. These foams have improved compressive strength and reduced aging time compared to plank made using a 100% butane blowing agent and the resins have greater melt strength for extrusion through the plank die. The benefits of the invention can be achieved in thicker grade polypropylene foams when the propane blowing agent includes up to about 75% by weight of isobutane or normal butane, and in thicker grade polyethylene foams with up to about 65% by weight of one or more butanes.

The foregoing and other objects, advantages, and features of the invention, and the manner in which the same are accomplished, will be more readily apparent upon consideration of the following detailed description of the invention taken in conjunction with the accompanying drawing, which illustrates preferred and exemplary embodiments of the invention.

BRIEF DESCRIPTION OF THE DRAWING

FIG. 1 is a graph illustrating the relationship between apparent extensional viscosity and strain rate for freshly extruded plasticized polyolefin resin, including examples prepared with a blowing agent in accordance with the invention compared to an example prepared with a butane blowing agent and an example extruded in the absence of blowing agent. An extruded rod of plasticized polyolfin resin is grabbed by a roller to accelerate the rod until it breaks. The force required to drive the roller, the roller speed, and the die exit velocity are taken into account to calculate the extensional viscosity, which is considered to be an indication of the melt strength of the resin. The data obtained is for a resin that is foaming and is in a transition state from the plasticized polyolefin resin in the exturder to the fully expanded cellular product.

DETAILED DESCRIPTION

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone, the mixing and cooling zones, and extruded through the die by a screw type apparatus. Single screw extruders are common, although double screw extruders sometimes are used for greater mixing and tandem extruders can be used to provide greater cooling of the resin prior to foaming.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention are the polyolefin resins, although not necessarily with equivalent results for different polyolefins. Polyolefin resins may be defined as semicrystalline polymers derived from unsaturated hydrocarbons containing the ethylene or diene functional groups. Semicrystalline polyolefin polymers are to be distinguished from polystyrene polymers and the like, which typically are amorphous and can have fundamentally different foaming characteristics.

Polyolefin resins may include virtually all of the addition polymers, however, the term polyolefin typically is used for polymers of ethylene, the alkyl derivatives of ethylene (the alpha-olefins), and the dienes. Among the more commercially important polyolefins are polyethylene, polypropylene, polybutene, and their copolymers.

Polyethylene is a whitish, translucent polymer of moderate strength and high toughness. Polyethylene is available in forms ranging in crystallinity from 25 to 95 percent. Polyethylene is available in low, medium, and high density polymer forms. For the low density material, the softening temperature is about 105° C. to 115° C. The softening temperature for the high density material is some 25° C. to 40° C. higher, or from about 130° C. to 140° C. Low, medium, and high density polyethylenes typically are suitable for extrusion foaming, including mixtures thereof, although not necessarily with equivalent results.

Polypropylene is also a whitish, translucent polymer and has a softening point of about 168 to 171° C., which is some 50 to 65° C. higher than that for polyethylene. Polypropylene has high tensile strength and maintains its strength even after repeated flexing. However, polypropylene does not typically have the toughness of polyethylene.

The invention is useful for producing thicker grade polyolefin foams and polyolefin plank. Thicker grades of polyolefin foams typically are considered to be about 12 mm or more thick and are often sold in thicknesses of about ½ inch, 1 inch, 1½ inches, 2 inches or more. Foam plank typically is considered to have a nominal thickness of about 50 mm (2 inches) or more. The thicker grades are to be distinguished from plyolefin foam sheets and thin sheets, which are generally less than 12 mm, and even less than 6 mm. Thicker grade foams can be used for a variety of purposes, including building materials, surfboards, rigid structural members, and insulation. Compressive strength is an important attribute of thicker grade foams and plank in many load bearing applications. In contrast, thin sheets are often used for protective purposes and compressive strength is not normally considered or relevant.

The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent. For a low density polyethylene, the expansion temperature will generally be in the range of from about 85° C. to 120° C.

The blowing agent contemplated for use in practicing the invention claimed herein comprises propane. Many of the benefits of the invention normally can still be achieved when butane is incorporated into the propane blowing agent in amounts of from 10, 20, 30, or 40% or more by volume up to a maximum of about 75%, depending on the polyolefin selected.

Unlike butane foams of the prior art, foam produced by the process of the invention with either pure propane or with mixtures of propane and either normal butane and isobutane typically can be shipped in a relatively short period. With needle punching, the residual levels of blowing agent are below the least explosive limit within about one week after the foam is produced, as explained below.

Table 1 below shows the upper and lower flammability limits in air for normal butane, isobutane, propane, and ethane based on the percent by volume of the hydrocarbon in air. The lower explosive limit for propane is 2.1 percent by volume in air compared to 1.8 percent for the butanes. Combined with the lower level of usage that is possible for propane blowing agent, 100 percent propane presents a concentration in fresh foam that rapidly declines below explosive limits, whereas butane often remains above the lowest explosive limit for a period of time.

TABLE 1

| Flammability Limits Vol. % In Air | | |
|---|---|---|
| | Lower | Higher |
| Butane (n or iso) | 1.8 | 8.4 |
| Propane | 2.1 | 9.5 |
| Ethane | 3.0 | 12.5 |

Propane has a higher foaming efficiency than the butanes. For a given weight, propane generates more gas volume than butane. Less propane typically is required than is required of the butanes to achieve a comparable foaming efficiency. Only about 12 percent by weight of the resin of propane is used as a blowing agent when pure propane is used, compared to about 16 percent for pure butane. Therefore, the plasticizing effect of propane as a blowing agent is much less than in the case of butane. The temperature of the resin in the extruder and die tends to increase and nucleation is more difficult to control with the typical active nucleators. Propane blowing agent used in the same amounts and with the same nucleators as butane produces small bubbles and a high density foam that is subject to collapse. Prefoaming in the extruder and corrugation of the foam can occur.

In the practice of the invention, process conditions and nucleation are carefully controlled to produce low density foams from a propane or propane and butane blend blowing agent that are dimensionally stable. A minimum die opening sufficient for preparing plank can be used to maintain sufficient pressure to prevent prefoaming. However, the minimum die opening increases the shear and heat and sensitivity of the system to nucleation.

Very low levels of relatively inactive metal oxide nucleators, from 0 to 0.8 percent by weight of the resin, such as zinc oxide and zirconium oxide, have been used in combination with propane blowing agent in accordance with the invention for foam extrusion of polyethylene foam. Another nucleator comprising sodium bicarbonate and citric acid is useful for producing fine cells in foams. The sodium bicarbonate and citric acid nucleator blend is available from BI Chemicals in Winchester, Va. under the trade name Hydrocerol.

While the foam can be made with a single screw extruder, it is helpful in the process of the invention to use tandem extruders where the first extruder is used for mixing and the second extruder is used to maximize cooling of the resin prior to foaming.

While no butane need be present when propane is used as a blowing agent in accordance with the invention, the benefits of the invention are still realized in foams produced with high percentages of butane in admixture with propane. The butane can be present in a ratio of from about 0:1 to 3:1 by weight for producing polypropylene foam, which is from 0 to about 75 percent by weight of butane. The butane can be present in a ratio of from about 0:1 to 1.9:1 by weight for producing polyethylene foam, which is from 0 to about 65 percent by weight of butane.

The blowing agent is mixed into the plasticized polyethylene polymer resin in proportions to achieve the desired degree of expansion in the resulting foamed cellular product. Stable foam densities from 40 kg/m$^3$ down to as low as 20 kg/m$^3$ may be made by practice of the invention. Stable foams of higher density, up to about 100 to 120 kg/m$^3$, can also be produced, if desired.

The blowing agent generally is mixed with the resin in a ratio of about one part blowing agent to ten parts resin. The maximum useful proportion of blowing agent in the plasticized resin is density related and is related to the pressure that is maintained on the resin in the extrusion die passage, as is believed to be well known to the skilled artisan.

The benefits of using the blowing agent in accordance with the invention claimed herein may be enhanced in preparing polyethylene foams by using a combination of a nucleation agent and an aging modifier to control cell size and development and to control the replacement of blowing agent with air in the cells of the foam, respectively. In particular, it has been found that a combination of low levels of relatively low activity metal oxide nucleation agents, such as zinc oxide, zirconium oxide, talc, and others, in combination with an aging modifier, including, for example, glycerol monostearate (GMS), is useful to further reduce the density of polyethylene foams and results in a thickness increase.

The aging modifier is mixed with the polyethylene resin prior to melting in an amount sufficient to produce a desirable rate of exchange of air with blowing agent in the cells of the foam. More specifically, GMS is mixed with the polyethylene resin prior to melting in an amount from about 0.5 to 5 kg per 100 kg of polyethylene resin. Still more specifically, GMS is added in an amount of 1 kg per 100 kg of polyethylene resin.

The blowing agent efficiency of propane is relatively high and various polyolefin resins can have different foaming characteristics. For example, polypropylene has a softening temperature that is about 50 to 65° C. higher than that for polyethylene. Less blowing agent is required to prepare polypropylene foams than is required to prepare polyethylene foams. Aging modifiers, including GMS are not typically needed to prepare polypropylene foams in accordance with the invention, although nucleation agents are used. GMS and similar compounds can be used to reduce friction induced static in polypropylene resins and foams.

Nucleation agent is mixed with polyolefin resin in an amount sufficient to promote nucleation and to develop a pore structure of the desired size. More specifically, nucleation agent is mixed with the resin in an amount of from about 0.05 to 0.5 kg per 100 kg of polyolefin resin. Generally, low activity metal oxide nucleators have proved useful for propane blown foams and the propane and butane blends described herein. As the percentage of $CO_2$ increases, it is helpful to use a low activity nucleator. Similar nucleation agents in similar amounts are beneficial in producing both polypropylene and polyethylene foams in accordance with the invention.

EXAMPLES

Example 1

Low density polyethylene resin having a melt index of 2 (Novacor 219) was prepared by adding 1 pph of talc and 1.2 pph of glycerol monostearate (GMS) to the plasticized resin and mixing thoroughly. Selected blowing agents were thereafter injected through a single port in the primary extruder of a tandem screw extruder. In one case, 7.5 parts per hour isobutane was injected as a blowing agent. In a second case, 6.4 parts per hour propane was injected as a blowing agent. In each case, the resin was then cooled in the secondary extruder of the tandem system and dispersed in a slab die for even expansion to form foam plank that was 54 millimeters thick (2.1 inches) and 64.5 centimeters wide.

These foams, whether produced with isobutane or propane blowing agent had an initial density of about 38.5 kilograms per cubic meter. The hot foam plank was allowed to reach room temperature naturally. Typically, a few hours is required for the plank core to reach room temperature. At one hour, 25 percent compression was applied to each foam sample to check the center strength. Plank made with isobutane had a compressive strength of 7.5 to 8.5 psig at 25 percent compression. The propane plank sample had a compressive strength of 9.5 to 11.0 psig at 25 percent compression. After two weeks storage, the isobutane plank had a compressive strength of 19 to 21 psig at 50 percent compression. The propane plank had a compressive strength of 21 to 23 psig at 50 percent compression, which shows an improvement in compressive strength.

Example 2

The propane and isobutane foams of Example 1 were needle punched in accordance with the procedures set forth in U.S. Pat. Nos. 5,424,016 and 5,585,058. Needle holes were applied 16 millimeters apart to accelerate removal of the residual blowing agent. Testing with a hand held hydrocarbon sniffer show that the propane plank took 2 to 3 weeks to reach 8 to 10 percent of the lowest explosive limit. The lowest explosive limit for propane is 2.1 percent by volume (Table 1). By comparison, the isobutane plank took 12 to 16 weeks to reach a similar level.

Example 3

The same low density polyethylene resin prepared as in Example 1 was mixed with a blowing agent comprising 35 percent by volume of propane and 65 percent by volume of isobutane at a concentrations shown in Table 2. The resin was extruded on a 150 millimeter twin screw extruder. The results are shown in Table 2 below.

TABLE 2

| Resin Rate Kg/Hr | B/A comp. | B/A Rate Kg/Hr | Density Kg/m$_3$ | Cell Count #/inch | 25% Comp. psi @ 1 hr |
|---|---|---|---|---|---|
| 295 | isobutane | 20.9 | 37.6 | 23 | 8.4 |
| 295 | 35/65 i-Bu/Pro | 19.1 | — | 21 | — |
| 295 | 35/65 i-Bu/Pro | 19.1 | 36.6 | 22 | 9.0 |

As shown in Table 2, a foam prepared in accordance with the invention has improved compressive strength at 25% compression 1 hour after extrusion compared to a foam prepared with 100% isobutane blowing agent of comparable density.

Example 4

A polypropylene resin was prepared in the absence of talc or glycerol monostearate or other aging modifiers and nucleating agents. The resin was mixed with either isobutane, propane, or a blend of isobutane and propane blowing agents and extruded to form a foam on tandem extruders. The primary extruder was 8.9 centimeters in diameter. The secondary extruder was 11.4 centimeters. The results are as shown in Table 3 below.

TABLE 3

| Resin Rate Kg/Hr | N/A pph | B/A Comp. | B/A Rate Kg/Hr | Density Kg/m$_3$ | Thickness cm | Cell Count #/inch | 30% Comp./Time psi/min |
|---|---|---|---|---|---|---|---|
| 118.2 | 1 | isobutane | 4.54 | 64 | 2.69 | 25 | 39.5*/100 |
| 118.2 | 2 | isobutane | 4.54 | 58.9 | 2.13 | 16 | 30.0/100 |
| 118.2 | 0.7 | 35/65 I-Bu/Pro | 4.09 | — | 1.85 | 20 | 37.5/70 |
| 118.2 | — | propane | 4.0 | 63.4 | 1.83 | 20 | — |
| 118.2 | 0.2 | propane | 4.0 | 48.2 | 1.60 | 13 | 40.0/40 |

*39% Compression

As clearly shown in Table 3, 100 percent isobutane blowing agent takes much longer to reach the same or comparable levels of compressive strength for foams of comparable density in comparison foams prepared in accordance with the invention.

Example 5

Extensional viscosity was evaluated as follows in accordance with the Cogswell formula as shown in F. N. Cogswell, *Polymer Melt Rheology*, p.55, Woodhead Publishing, London, (1981) and as applied in a similar setup by S. T. Lee and N. S. Ramesh, Adv. Polym. Tech. 15, 4 (1996). Cogswell developed the extensional viscosity equation for the orifice die. The Cogswell formula is a useful tool for evaluating resin foaming characteristics and has been used to generate yield force data for calculating extensional viscosity.

When the extensional viscosity of a resin melt in an extruder is measured, the resin melt undergoes acceleration in the direction of flow when the cross-sectional flow area is decreased, such as when the polymer melt passes through a constriction such as a slab die. The polymer tends to react and the resistance toward the stretching that is induced by acceleration of the polymer in the flow direction is evaluated as "extensional viscosity." For semi-crystalline, low density polyethylene, a higher extensional viscosity correlates with a higher degree of branching then enhances melt strength for better forming.

In contrast, in the Cogswell method, as applied to a transition state polyolefin, a rod of plasticized polyolfin resin is extruded through a capillary die and then grabbed by a roller outside the capillary die to accelerate the rod until it breaks. Foam is starting to appear at this stage. The extruded rod is in a transition state between the plasticized polyolefin in the extruder and an expanded cellular product. The force required to drive the roller, the roller speed, and the die exit velocity are taken into account to calculate the extensional viscosity, which is considered to be an indication of the melt strength of the resin in the machine direction. It is believed that this property is similar in the transition state, it which some foaming has occurred, to the same property in the fully expanded cellular state. It is also believed that the properties should be somewhat similar in the machine direction, the cross direction, and the thickness direction.

The trials were carried out on a co-rotating Haake twin-screw extruder having a capillary die. Low density polyethylene resin of Example 1 was used. The plasticized resin was extruded in the absence of blowing agent, with a 100% propane blowing agent, and with a 100% isobutane blowing agent. The results are shown in FIG. 1.

As shown in FIG. 1, the extensional viscosity of plasticized polyolefin resin having a propane blowing agent mixed therewith is close to the extensional viscosity for the plasticized resin in the absence of blowing agent, indicating that the melt strength of the resin is not significantly reduced by the presence of propane blowing agent. FIG. 1 shows that resin incorporating a propane blowing agent has a much better melt strength than resin incorporating an isobutane blowing agent.

Resin with isobutane was shown to have an apparent extensional viscosity of at least about $4.5 \times 10^5$ to $4.6 \times 10^6$ poise at a strain rate of from at least about 1.9 to 40 per second. Resin with no blowing agent was shown to have an apparent extensional viscosity of at least about $1.8 \times 10^6$ to $6.1 \times 10^6$ poise at a strain rate of from at least about 2.1 to 28 per second. Resin with propane, which is a blowing agent for use according to the invention, is shown to have an extensional viscosity of from at least about $1.2 \times 10^6$ to $7 \times 10^6$ poise at a strain rate of from at least about 1.9 to 40 per second.

The invention claimed herein has been described hereinabove with respect to particular preferred embodiments. These embodiments should be considered illustrative of and not in limitation of the invention claimed herein. The full scope of the invention should be judged in accordance with the appended claims and equivalents thereto.

What is claimed is:

1. An extruded polyolefin foam having a nominal thickness of at least about 12 mm wherein said foam is expanded by a blowing agent comprising from about 25 to 100 percent by weight of propane and from about 0 to 75 percent by weight of isobutane, normal butane, or a mixture of isobutane and normal butane, and wherein said blowing agent does not substantially alter the extensional viscosity of said polyolefin.

2. The foam of claim 1 wherein said blowing agent is propane.

3. The foam of claim 1 wherein said blowing agent is about 35 percent propane and 65 percent by weight of isobutane, normal butane, or a mixture of iso- and normal butane.

4. The foam of claim 1 wherein said blowing agent is about 50 percent propane and 50 percent by weight of isobutane, normal butane, or a mixture of iso- and normal butane.

5. The foam of claim 1 wherein said blowing agent is about 70 percent propane and 30 percent by weight of isobutane, normal butane, or a mixture of iso- and normal butane.

6. The foam of claim 1 wherein said blowing agent is about 90 percent propane and 10 percent by weight of isobutane, normal butane, or a mixture of iso- and normal butane.

7. The foam of claim 1 wherein said foam has a compressive strength about one hour after extrusion of from about 9 to 12 psig at 25 percent compression by unit volume.

8. The foam of claim 7 wherein said foam has a compressive strength about one hour after extrusion of from about 9.5 to 11.0 psig at 25 percent compression by unit volume.

9. The foam of claim 1 wherein said foam has a compressive strength about two weeks after extrusion of from about 20 to 25 psig at 50 percent compression by unit volume.

10. The foam of claim 1 wherein said foam has a compressive strength of from about 35 to 45 psig at 30 percent compression per minute by unit volume.

11. The foam of claim 10 wherein said foam has a compressive strength of from about 35 to 40 psig at 30 percent compression per minute by unit volume.

12. The foam of claim 1 wherein said foam reaches its lowest explosive limiting value within about 2 weeks after extrusion when needle punched with a distance of about 16 mm between needle holes.

13. The foam of claim 1 wherein said polyolefin is selected from the group consisting of polyethylene, polypropylene, and mixtures thereof.

14. The foam of claim 13 wherein said polyolefin is low density polyethylene.

15. The foam of claim 14 wherein said low density polyethylene has a melt index of about 2.

16. The foam of claim 1 wherein said foam has a nominal thickness of at least about 25 mm.

17. The foam of claim 1 wherein said foam has a nominal thickness of at least about 37 mm.

18. The foam of claim 1 wherein said foam has a thickness of at least about 50 mm.

19. The foam of claim 1 wherein said foam has a cell count of from about 10 to 30 cells per inch.

20. The foam of claim 1 wherein said foam has a cell count of from about 18 to 25 cells per inch.

21. The foam of claim 1 wherein said foam has a density of from about 20 to 150 kg/m$^3$.

22. The foam of claim 1 wherein said foam has a density of from about 30 to 75 kg/m$^3$.

23. The foam of claim 1 wherein said polyolefin is low density polyethylene and further comprises glycerol monostearate and talc, and wherein said blowing agent comprises propane and from 0 to 65 percent by weight of isobutane, normal butane, or a mixture of iso- and normal butane.

24. An extruded polyolefin foam having a thickness of at least about 50 mm and a density of from about 20 to 120 kg/m$^3$, wherein said polyolefin is selected from the group consisting of low density polyethylene, polypropylene, and mixtures thereof, wherein said foam has a compressive strength about one hour after extrusion of from about 9 to 12 psig at 25 percent compression by unit volume, and wherein said foam is expanded by a blowing agent comprising from about 25 to 100 percent propane and from about 0 to 75 percent by volume of isobutane, normal butane, or a mixture of isobutane and normal butane.

25. A process for producing an extruded low density polyolefin foam having a thickness of at least about 12 mm, said process comprising the steps of:
   a) mixing a blowing agent with a plasticized polyolefin resin, wherein the blowing agent is selected from the group consisting of 100 percent by weight of propane and blends of propane with up to about 75% by weight of normal butane or isobutane or a mixture thereof; and
   b) extruding the mixture of resin and blowing agent so as to produce a foam having a thickness of at least about 12 mm at an extensional viscosity that is not substantially altered from that of the resin in the absence of blowing agent.

26. A process for producing an extruded low density polyolefin foam having a thickness of at least about 12 mm, said process comprising the steps of:
   a) mixing a blowing agent with a plasticized polyolefin resin, wherein the blowing agent is selected from the group consisting of 100 percent by weight of propane and blends of propane with up to about 75% by weight of normal butane, isobutane, or a mixture of normal butane and isobutane; and
   b) extruding the mixture of resin and blowing agent so as to produce a foam having a foam plank having a compressive strength about one hour after extrusion of from about 9 to 12 psig at 25 percent compression by unit volume.

27. An extruded low density polyethylene foam having a nominal thickness of at least about 12 mm wherein said foam is expanded by a blowing agent comprising propane and from 0 to 75 percent by weight of isobutane, normal butane, or a mixture of isobutane and normal butane and wherein said foam has an apparent extensional viscosity at a die temperature of about 110° C. of from about $1.2 \times 10^6$ poise at a strain rate of about 1.9 per second to $7 \times 10^6$ poise at a strain rate of about 40 per second.

28. An extruded polyolefin foam having a nominal thickness of at least about 12 mm, wherein said foam is expanded by a blowing agent comprising from about 25 to 100 percent by weight of propane and from about 0 to 75 percent by weight of isobutane, normal butane, or a mixture of isobutane and normal butane, and wherein said foam has a compressive strength about one hour after extrusion of from about 9 to 12 psig at 25 percent compression by unit volume.

29. The foam of claim 28 wherein said polyolefin comprises low density polyethylene.

* * * * *

UNITED STATES PATENT AND TRADEMARK OFFICE
CERTIFICATE OF CORRECTION

PATENT NO. : 6,030,696
DATED : February 29, 2000
INVENTOR(S) : Lee

It is certified that error appears in the above-identified patent and that said Letters Patent is hereby corrected as shown below:

Title page, [56] References Cited, U.S. PATENT DOCUMENTS, line 9, "4,214,056" should read --4,214,054--.

Signed and Sealed this

Sixth Day of February, 2001

Attest:

Q. TODD DICKINSON

*Attesting Officer*  *Director of Patents and Trademarks*